(12) United States Patent
Singh

(10) Patent No.: US 9,203,676 B1
(45) Date of Patent: Dec. 1, 2015

(54) APPARATUS AND METHOD FOR ESTIMATING SYMBOL TIMING OFFSET

(71) Applicant: Wipro Limited, Bangalore (IN)

(72) Inventor: Shashi Kant Singh, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/447,988

(22) Filed: Jul. 31, 2014

(30) Foreign Application Priority Data

Jun. 11, 2014 (IN) .......................... 2851/CHE/2014

(51) Int. Cl.
| | | |
|---|---|---|
| *H04L 7/00* | (2006.01) | |
| *H03K 9/00* | (2006.01) | |
| *H04L 27/06* | (2006.01) | |
| *H04L 27/26* | (2006.01) | |

(52) U.S. Cl.
CPC ........ *H04L 27/2662* (2013.01); *H04L 27/2695* (2013.01)

(58) Field of Classification Search
USPC ................................. 375/219, 220, 222, 240, 375/240.26–240.28, 240.02, 285, 284, 259, 375/295, 316, 346, 348, 347, 340, 339, 324, 375/326, 354, 364, 362, 355
See application file for complete search history.

(56) References Cited

U.S. PATENT DOCUMENTS

| | | | | |
|---|---|---|---|---|
| 5,745,531 A | * | 4/1998 | Sawahashi | ........... H04B 1/1027 375/345 |
| 8,243,777 B2 | | 8/2012 | Yang et al. | |
| 2004/0258098 A1 | * | 12/2004 | Ohkubo | ............... H04B 7/2687 370/503 |
| 2005/0147186 A1 | * | 7/2005 | Funamoto et al. | ............ 375/324 |
| 2006/0104254 A1 | * | 5/2006 | Shin | ..................... H04L 27/2657 370/343 |
| 2011/0164708 A1 | * | 7/2011 | Wang | ................... H04L 27/2663 375/343 |
| 2012/0057872 A1 | * | 3/2012 | Freda et al. | ...................... 398/76 |
| 2013/0071122 A1 | * | 3/2013 | Sasaki | ............................ 398/79 |

OTHER PUBLICATIONS

Hong, Y., et al., "An Improved Doppler Frequency Offset Estimation Algorithm of OFDM System under High-speed Movement Environment", Journal of Computers, Dec. 2013, vol. 8 Issue 12, p. 3191.
Beek, J., et al., "ML Estimation of Time and Frequency Offset in OFDM Systems", IEEE Transactions on Signal Processing, Jul. 1997, vol. 45, No. 7, pp. 1800-1805.

* cited by examiner

*Primary Examiner* — Linda Wong
(74) *Attorney, Agent, or Firm* — LeClairRyan, a Professional Corporation

(57) ABSTRACT

Systems and methods for estimating symbol timing offset in wireless communication networks are described herein. In one example, the method comprises converting a received signal into digital samples and decoding symbols from the digital samples based on estimation of symbol timing offsets (STO), cyclic prefix (CP) correlation peaks and CP correlation confidence levels. The method further comprises decoding frames by processing the decoded symbols, and obtaining data from the decoded frames, wherein the data is to be forwarded to applications of the communication unit.

12 Claims, 5 Drawing Sheets

APPARATUS AND METHOD FOR ESTIMATING SYMBOL TIMING OFFSET

This application claims the benefit of Indian Patent Application Serial No. 2851/CHE/2014 filed Jun. 11, 2014, which is hereby incorporated by reference in its entirety.

FIELD

The present subject matter relates to wireless communication systems, and, particularly but not exclusively, to estimating symbol timing offset in wireless communication networks.

BACKGROUND

A high-speed environment, in which the user equipment (UE) moves at speeds of two hundred kilometers per hour or more, poses a great challenge for mobile communications. The Doppler Effect and quick handover are the toughest problems to deal with. The higher the speed is, the worse the effects are.

When the UE is in movement, the frequency of signals at the receiver end will change. This is commonly known as the Doppler Effect. The frequency change is referred to as the Doppler shift and its effect is observed on both the NodeB and the UE. The Doppler shift can degrade communication quality, and even induce service interruption. The Doppler Effect is especially cumbersome in a high-speed environment.

In modulation coherence adopted by the NodeB, the carrier used for demodulation must be operating on the same frequency and phase as that of the signal carrier. Frequency shift caused by the Doppler Effect, which, in some cases, may be as much as 750 Hz in the uplink, clearly has a deleterious effect on demodulation performance and further adversely affects service access, system capacity and coverage.

SUMMARY

Disclosed herein are apparatus and methods for estimating symbol timing offset in wireless communication networks. In one example, the apparatus for estimating symbol timing offset in wireless communication networks In an aspect of the invention, the method for estimating symbol timing offset in wireless communication networks comprises converting a received signal into digital samples and decoding symbols from the digital samples based on estimation of symbol timing offsets (STO), cyclic prefix (CP) correlation peaks and CP correlation confidence levels. The method further comprises decoding frames by processing the decoded symbols, and obtaining data from the decoded frames, wherein the data is to be forwarded to applications of the communication unit.

In another aspect of the invention, a communication unit (also referred to as the apparatus) for estimating symbol timing offset, wherein the communication unit is coupled to at least one of an inbuilt processor and an external processor, and wherein the communication unit comprises a memory communicatively coupled to at least one of the inbuilt processor and the external processor, wherein the memory stores processor-executable instructions, which, on execution, cause the communication unit to convert a received signal into digital samples, decode symbols from the digital samples based on estimation of symbol timing offsets (STO), cyclic prefix (CP) correlation peaks and CP correlation confidence levels, decode frames by processing the decoded symbols, and obtain data from the decoded frames, wherein the data is to be forwarded to applications of the communication unit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
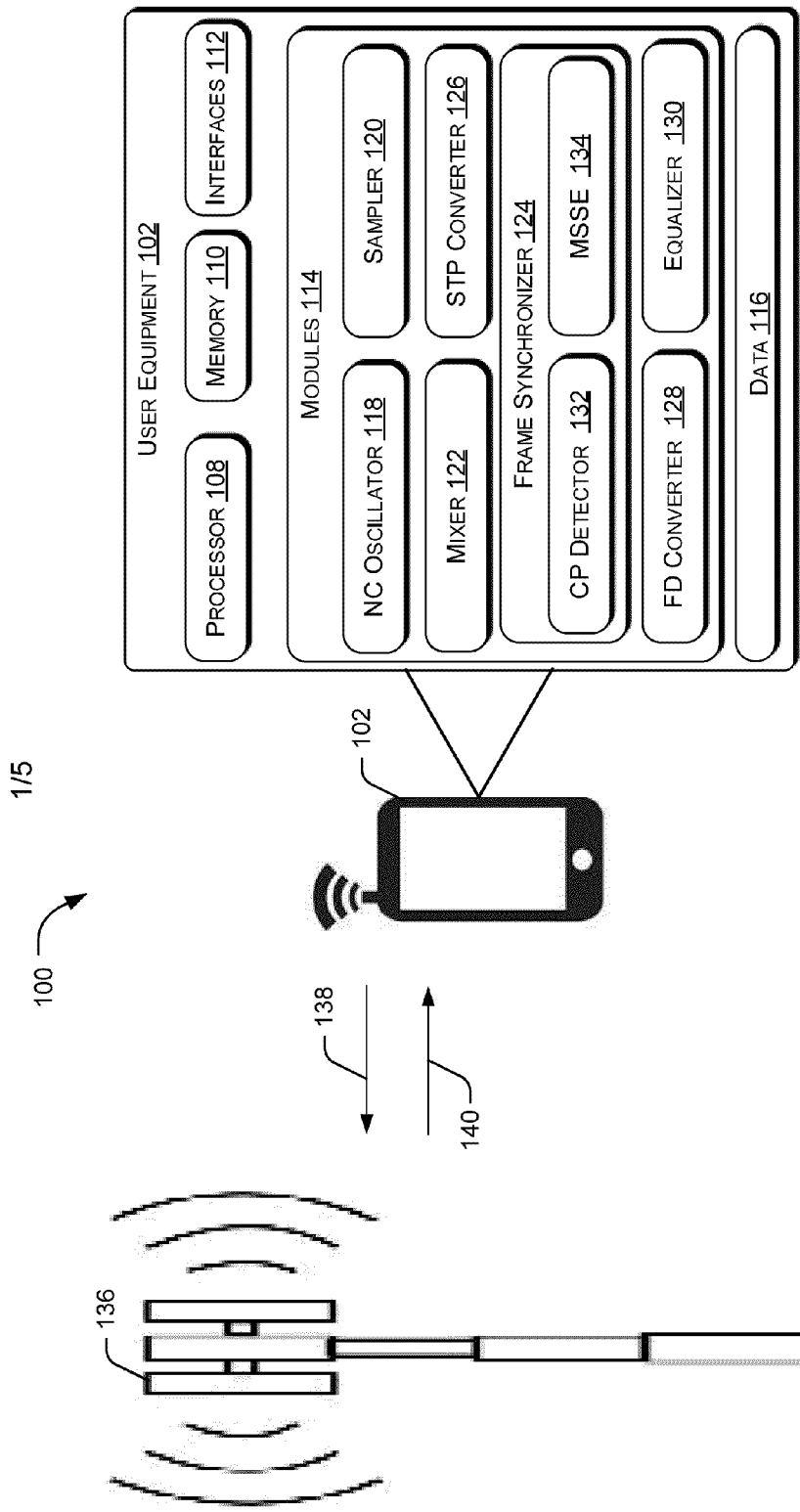
FIG. 1 illustrates a network environment incorporating an apparatus for estimating symbol timing offset in wireless communication networks, according to some embodiments of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Apparatus and methods for estimating symbol timing offset in wireless communication networks are described herein. The systems and methods may be implemented in a variety of computing systems. The computing systems that can implement the described method(s) include, but are not limited to a smart phone, a mobile device, a personal digital assistant, a tablet, a multimedia device, an electronic book (e-book) reader, a gaming console and in a mobile computing environment. Although the description herein is with reference to certain computing systems, the systems and methods may be implemented in other computing systems, albeit with a few variations, as will be understood by a person skilled in the art.

Conventionally, the Universal Mobile Telecommunications System (UMTS) UMTS network is designed in such a way that all transmitters use one and the same carrier frequency. A UE that moves through the network has to be able to receive signals from different transmitters, and be able to discriminate between them. This has been described in the 3rd Generation Partnership Project (3GPP) international standard. In this standard, stern demands are set to the synchronization of the UMTS transmitters. By this movement, UMTS compliant UEs experience a Doppler shift while receiving the UMTS signals.

Moreover, there is an analogy between the bad synchronization in the transmitter and the mobile movement. The first phenomenon modifies the carrier frequency sent. In the second case, the Doppler Effect changes the received carrier frequency. The channel modifies the spectrum of the signal and this can have the same effect as a failure of synchronization in the Base Station (BS). Both phenomena create the same problem in the signal reception: a frequency shift.

The UMTS signal experience different phenomena during the travel from the transmitter to the receiver. These different effects such as Fading, Doppler shift or AOA (Angle of arrival) of the different multipath components have influence on the received frequency.

Moreover, when the UE is at variable speed (i.e., accelerating or decelerating), the Doppler Effect would vary to up to some maximum deviation (both sides) depending on the speed of the UE. As would be evident to the readers, the direction of the movement of UE with respect to the base station would decide the positive or negative Doppler. This Doppler Effect causes the local oscillator (LO), which is typically implemented using a Numerical Controlled Oscillator (NCO), frequency to be misaligned with the Doppler infected received frequency. This misalignment cause frequency offset Similarly Symbol Timing Offset (STO) is generated since the received frames at UE would arrive a slightly earlier (if the UE is moving towards base station) or a slightly later (if the UE is moving away from the base station). The time period by which frame would be received earlier or later depends on the speed and direction of the UE with respect the base station. Abrupt changes in speed has a still adverse impact on frame arrival timing recovery compared to constant speed UE as the prediction on next frame timing could not be estimated accurately enough due to abrupt change in speed.

The present subject matter discloses apparatuses and methods for estimating symbol timing offset in wireless communication networks. The principles of the present subject matter are described with the help of an example in which a UE is travelling at high speeds. The present subject matter describes an improved UE which is capable of predicting the possible symbol timing offset based on the movement information of the UE and perform compensation for the determined offset to minimize frame sync loss.

In one example, the methods for estimating symbol timing offset in wireless communication networks, as described in this subject matter, are implemented using a communication unit which may be incorporated in any new or existing UE. The communication unit is also interchangeably referred to as an apparatus for estimating symbol timing offset in wireless communication networks.

In one example, the apparatus, for estimating symbol timing offset in wireless communication networks, receives a signal and converts the signal into digital samples. The apparatus thereafter decode symbols from the digital samples, based on based on estimation of symbol timing offsets (STO), cyclic prefix (CP) correlation peaks and CP correlation confidence levels.

In one example, the process of decoding symbols from digital samples involves the apparatus to ascertain whether symbol tracking is enabled. On determining symbol tracking to be enabled, the apparatus calculates symbol timing offset (STO) estimates per symbol. Thereafter, the apparatus performs perform symbol timing adjustments based on the STO estimates and estimates CP correlation peaks and CP correlation confidence level On completion of the decoding of symbols, the apparatus decode frames by processing the decoded symbols and obtain data from the decoded frames. Thereafter, the apparatus provides the data to one or more applications. Thus, the apparatus provides for predicting the possible symbol timing offset due to the movement an UE and performs adequate compensation for the determined offset to minimize frame sync loss. The apparatus addresses the issue of symbol timing offset and provides a mechanism to facilitate communication in fast moving UEs.

The working of the apparatuses and methods for estimating symbol timing offset in wireless communication networks is described in greater detail in conjunction with FIG. 1-.5. It should be note that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates a network environment 100 incorporating an apparatus or a user equipment (UE) 102 for estimating symbol timing offset in wireless communication networks, according to some embodiments of the present subject matter. In one implementation, the UE 102 may be implemented as a smartphone, a mobile phone, a gaming console, a multimedia device, a personal digital assistant, a tablet, an electronic book (e-book) reader, and so on. The UE 102 may also include other portable computing devices which are capable of communicating with cellular networks.

In one implementation, the UE 102 includes a processor 108, a memory 110 coupled to the processor 108 and interfaces 112. The processor 102 may be implemented as one or more microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions stored in the memory 110. The memory 110 can include any non-transitory computer-readable medium known in the art including, for example, volatile memory (e.g., RAM), and/or non-volatile memory (e.g., EPROM, flash memory, etc.).

The interface(s) 112 may include a variety of software and hardware interfaces, for example, a web interface, a graphical user interface, etc., allowing the UE 102 to interact with other computing devices. Further, the interface(s) 112 may enable the UE 102 to communicate with other computing devices, The interface(s) 112 can facilitate multiple communications within a wide variety of networks and protocol types, including wired networks, for example LAN, cable, etc., and wireless networks such as WLAN, cellular, or satellite. The interface(s) 112 may include one or more ports for connecting a number of devices to each other or to another server.

In one example, the UE 102 includes modules 114 and data 116. In one embodiment, the modules 114 and the data 116 may be stored within the memory 110. In one example, the modules 114, amongst other things, include routines, programs, objects, components, and data structures, which perform particular tasks or implement particular abstract data types. The modules 114 may also be implemented as, signal processor(s), state machine(s), logic circuitries, and/or any other device or component that manipulate signals based on operational instructions. Further, the modules 114 can be implemented by one or more hardware components, by computer-readable instructions executed by a processing unit, or by a combination thereof.

In one implementation, the modules 114 further include a Numerical Controlled Oscillator (NCO) 118, a sampler 120, a mixer 122, a serial to parallel (STP) converter 126, a frame synchronizer 124, a frequency domain converter 128 and an equalizer 130. In one example, the frame synchronizer 124 comprises of two sub-modules namely the correlation peak (CP) detector 132 and the movement, speed & STO estimator (MSSE) 134. The UE 102 may also include other modules (not shown in figure). The other modules may perform various miscellaneous functionalities of the UE 102. It will be appreciated that such aforementioned modules may be represented as a single module or a combination of different modules.

In one example, the data 116 serves, amongst other things, as a repository for storing data fetched, processed, received and generated by one or more of the modules 114. In some embodiment, the data 116 may be stored in the memory 110 in the form of various data structures. Additionally, the aforementioned data can be organized using data models, such as relational or hierarchical data models. The data 116 may be used to store data, including temporary data and temporary files, generated by the modules 114 for performing the various functions of the UE 102.

In one example, the US 102 is capable of establishing connection with a cellular network represented by its base station 136. A cellular network (also referred to as a mobile network) is a wireless network distributed over land areas called cells, each served by at least one fixed-location transceiver, known as a cell site or base station. In the cellular network, each cell uses a different set of frequencies from neighboring cells, to avoid interference and provide guaranteed bandwidth within each cell. The cellular network may adhere to various standards and protocols, such as Long Term Evolution (LTE) and 3GPP.

In operation, the UE 102 is in motion with respect to the base station 136. The motion may be towards the base station 136 as indicated by the arrow 138 or may be away from the base station as indicated by the arrow 140. The motion may be moving at a uniform speed or may be at a varying speed, i.e., the UE 102 may be accelerating or decelerating at a uniform or varying rate.

In one implementation, the UE 102 receives the signal from the base station 136. The received signal is mixed with the NC oscillator 118. NCO may be understood to be a digital signal generator which creates a synchronous (i.e. clocked), discrete-time, discrete-valued representation of the signal and is used in conjunction with a digital-to-analog converter (DAC) at the output to create a direct digital synthesizer. In one example, the mixer 122 mixes the received signal with the local oscillator to generate the intermediate frequency signal which can be used to decode the data in the received signal. The sampler 120 samples the received signal. In one example, the signal may be passed through a low pass filter to facilitate the sampling. In one example, the frame synchronizer 124 maintains an estimation of symbol timing offset for subsequent frames based on the prior frame's symbol timing offsets. This estimation is further used to correct the symbol timing offset of current symbol. As mentioned earlier, the frame synchronizer 124 comprises the CP detector 132 and the MSSE 134. The CP detector 132 performs CP autocorrelation to generate the CP correlation peaks and then generates the CP correlation confidence level. The MSSE 134 module generates the estimates of the STO based on the movement speed of the UE 102 and based frames estimates value. The detailed working of the frame synchronizer 124 and its components is elaborated below.

In operation the process of decoding symbols from digital samples involves ascertaining whether symbol tracking is enabled. In one example, the MSSE 134 determines whether the symbol tracking is enabled. Thereafter, the MSSE 134 calculates STO estimates per symbol on determining symbol tracking to be enabled. Thereafter, the CPD 132 performs symbol timing adjustments based on the STO estimates and estimates the CP correlation peaks and CP correlation confidence level.

In operation, the MSSE 134 received the CP correlation peaks and the CP correlation confidence level from the CP Detector 132. If the CP Correlation Confidence Level is greater than the pre-configured threshold, the MSSE 132 computes the timing interval of the CP correlation Peaks and the timing interval of the expected location of CP correlation peaks based on the first CP correlation peak. In some implementations, the MSSE 134 may base the computation of the timing interval of the previous stored frames. The difference between the timing interval of the CP correlation Peaks and the timing interval of the expected location of CP correlation peaks enables the MSSE 134 to determine the acceleration or the deceleration of the UE 102. The MSSE 134 may also determine an average estimate and can be used to predict the new set of STO estimates based on the difference between the timing interval of the CP correlation Peaks and the timing interval of the previous stored frames. If the speed of the UE 102 is above a certain threshold (say 350 kilometers per hour), the MSSE 134 may enable symbol tracking. The MSSE 134 forwards the symbol tracking enabled and the STO estimates to the CP detector 132.

On receiving the symbol tracking enabled and the STO estimates, the CP detector 132 uses the STO estimate to perform CP autocorrelation to generate symbol timing. The CP detector 132 will generate the synchronization signals and provide symbol timing to a frame decoder (not shown in figure) of the UE 102. The frame decoder may be specifically a PSS/SSS (primary synchronization signals/secondary synchronization signals) frame decoder which decodes the primary and secondary synchronization signals.

Thereafter, the CP detector 132 performs the estimation of the CP correlation peak. The CP auto-correlation values may vary based on various factors, such as the interference level of the radio channel, the signal to noise ratio (SNR) of the received signals, the transmissions carried out to other UEs and so on. For example, the number of peaks would be more in case of high transmissions to other UEs 102. These peaks would show high maximum or minimum delta in case of high SNR but it would show a low delta in case of low SNR. Similarly in case of high interference levels, the delta is going to be low.

In one example, the CP detector 132 implements adaptive technique in the following way. The CP detector 132 tracks the high values of the maximum and/or minimum deltas and stores the same in the memory (for example as data 116) at periodic intervals. These delta values change based on the factors mentioned earlier. Based on the range of the delta values, the threshold values may be adjusted by the CP detector 132. For example if the delta is high and number of peaks is within a reasonable number, say twenty five, then threshold can be set at higher end of maximum value. Similarly if the delta is low and number of peaks is excessively more than the average number then the processing of the frame can skipped. Other conditions are mentioned in form of Table 1 below:

TABLE 1

| Condition | Effect on Threshold |
| --- | --- |
| Delta is medium and number of peaks is at around average value | Threshold is set around maximum value |
| Delta is medium and number of peaks is slightly more than the average value | a) If the previous location of reference is known with >80% confidence then the threshold is set to include those positions<br>b) If the previous location of reference is known with <40% confidence then the threshold is set after following:<br>  a. In case a pattern is found with >=50% then the threshold is set to include all these peaks<br>  b. In case the pattern is found with <50% confidence then the processing of the frame is skipped<br>  c. For the rest of the cases, peak patterns at slot interval are to be extensively searched and threshold is set to cover average number of peaks. |

In one example, the CP detector 132 may derive the confidence parameter based on the historical statistic from previous 100 frames. The CP detector 132 estimates the CP Correlation confidence level as per Table 2 below:

TABLE 2

| CP Correlator Confidence level | Process | |
| --- | --- | --- |
| <40%: | a) | Window is set at maximum value till the confidence level exceeds 40% |
| >40%: | a) | A sliding window is used |
| | b) | Each time there is an increase in CP correlator confidence level, the window size is decreased |
| | c) | If the CP correlator confidence level does not cross 80% mark with a predefined time period of T seconds, then the window size is reverted back to maximum value |

It will be appreciated by the reader that the values 40%, 80%, 100 previous frames have been used as an example and the present subject matter may be implemented with other values as well.

On completion of the decoding of symbols, the STP converter 126 converts the received samples from serial to parallel, based on the number of carriers, to which it may belong. The FD converter 128 converts the symbols into frequency domain for further processing. Based on the processing the frames are decoded from the symbols to obtain the data from the frames. In some implementations, the equalizer 130 performs the equalization to decode the actual data bits from the decoded frames. Thereafter, the equalizer 130 provides the data to one or more applications of the UE 102.

Thus, the UE 102 provides for predicting the possible symbol timing offset due to the movement the UE 102 and performs adequate compensation for the determined offset to minimize frame sync loss. The UE 102 addresses the issue of symbol timing offset and provides a mechanism to facilitate communication in fast moving UEs.

Thus, the present subject matter facilitates estimating symbol timing offset in wireless communication networks. The detailed working of the UE 102 for estimating symbol timing offset in wireless communication networks is further explained in conjunction with the FIGS. 2-5.

Figure 2:
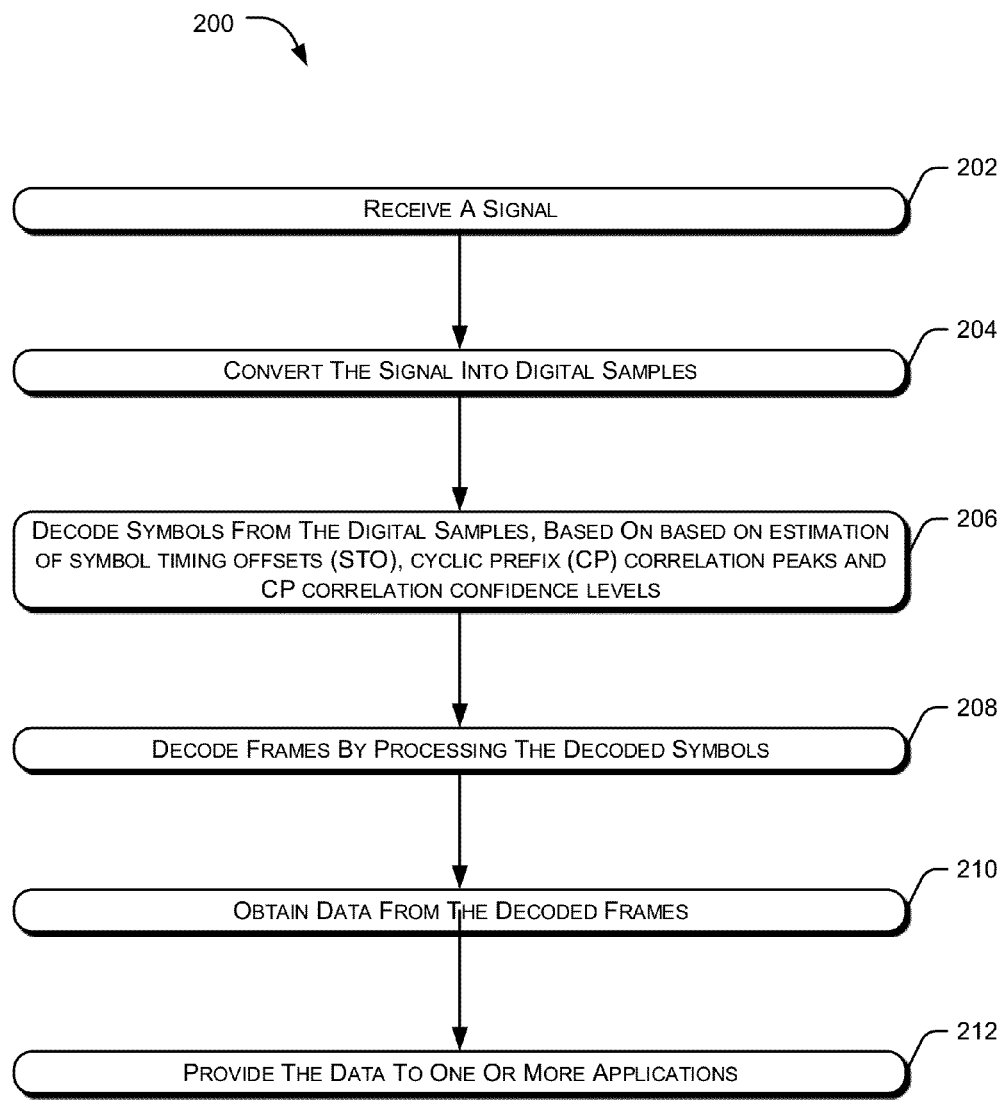
FIGS. 2, 3, and 4 illustrate exemplary computer implemented methods for estimating symbol timing offset in wireless communication networks, according to an embodiment of the present subject matter.

FIG. 2, 3, 4 illustrate exemplary computer implemented methods 200, 300, and 400 respectively for estimating symbol timing offset in wireless communication networks, according to an embodiment of the present subject matter. The methods 200, 300, and 400 may be described in the general context of computer executable instructions. Generally, computer executable instructions can include routines, programs, objects, components, data structures, procedures, modules, and functions, which perform particular functions or implement particular abstract data types. The methods 200, 300, and 400 may also be practiced in a distributed computing environment where functions are performed by remote processing devices that are linked through a communication network. In a distributed computing environment, computer executable instructions may be located in both local and remote computer storage media, including memory storage devices.

The order in which the methods 200, 300, and 400 is described is not intended to be construed as a limitation, and any number of the described method blocks can be combined in any order to implement the methods 200, 300, and 400 or alternative methods. Additionally, individual blocks may be deleted from the methods 200, 300, and 400 without departing from the spirit and scope of the subject matter described herein. Furthermore, the methods 200, 300, and 400 can be implemented in any suitable hardware, software, firmware, or combination thereof.

With reference to method 200 as depicted in FIG. 2, as shown in block 202, a signal is received by the UE 102 from a base station. In one example, the antenna of the UE 102 received the signal.

As illustrated in block 204, the signal is converted into digital samples. In one example, the received signal is mixed with the NC oscillator 118. The sampler 120 then samples the received signal. In one example, the signal may be passed through a low pass filter to facilitate the sampling. Thereafter, the signal is converted to digital samples by the sampler 120.

As depicted in block 206, symbols are decoded from the digital samples, based on based on estimation of symbol timing offsets (STO), cyclic prefix (CP) correlation peaks and CP correlation confidence levels. In one example, the frame synchronizer 124 decodes the symbols from the digital samples, based on based on estimation of symbol timing offsets (STO), cyclic prefix (CP) correlation peaks and CP correlation confidence levels.

At block 208, the frames are decoded by processing the decoded symbols. In one example, the processing is done by the STP converter 126 and the FD converter 128. The STP converter 126 converts the received samples from serial to parallel, based on the number of carriers, to which it may belong. The FD converter 128 converts the symbols into frequency domain for further processing. Based on the processing the frames are decoded from the symbols.

As shown in block 210, data is obtained from the decoded frames. In one example, the equalizer 130 performs the equalization to decode the actual data bits from the decoded frames.

As depicted in block 212, the data is provided to one or more applications of the UE 102. In one example, the equalizer 130 forwards the data to various applications installed or running on the UE 102.

Figure 3:
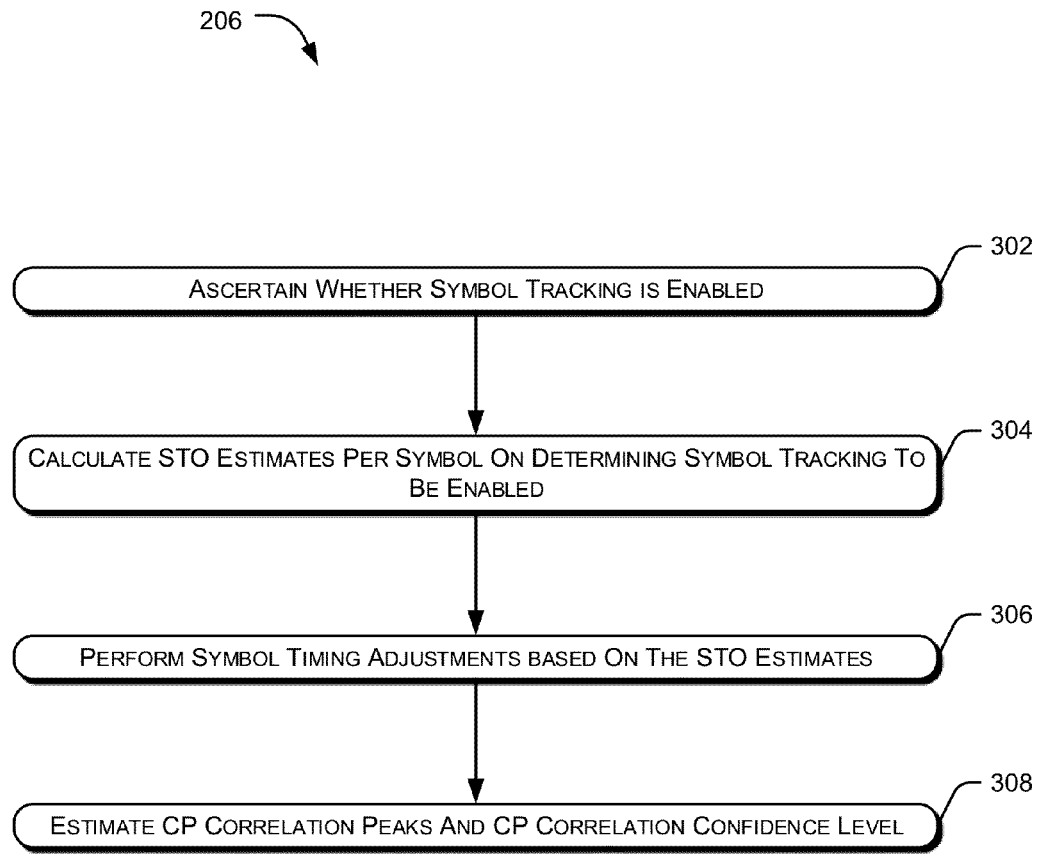

With reference to method 300 as depicted in FIG. 3, as shown in block 302, ascertain whether symbol tracking is enabled. In one example, the MSSE 134 determines whether the symbol tracking is enabled.

As illustrated in block 304, STO estimates per symbol is calculated on determining symbol tracking to be enabled. In one example, the MSSE 134 calculates STO estimates per symbol on determining symbol tracking to be enabled.

As depicted in block 306, symbol timing adjustments is performed based on the STO estimates. In one example, the CPD 132 performs symbol timing adjustments based on the STO estimates.

At block 308, CP correlation peaks and CP correlation confidence level are estimated. In one example, the CPD 132 estimates the CP correlation peaks and CP correlation confidence level.

Figure 4:
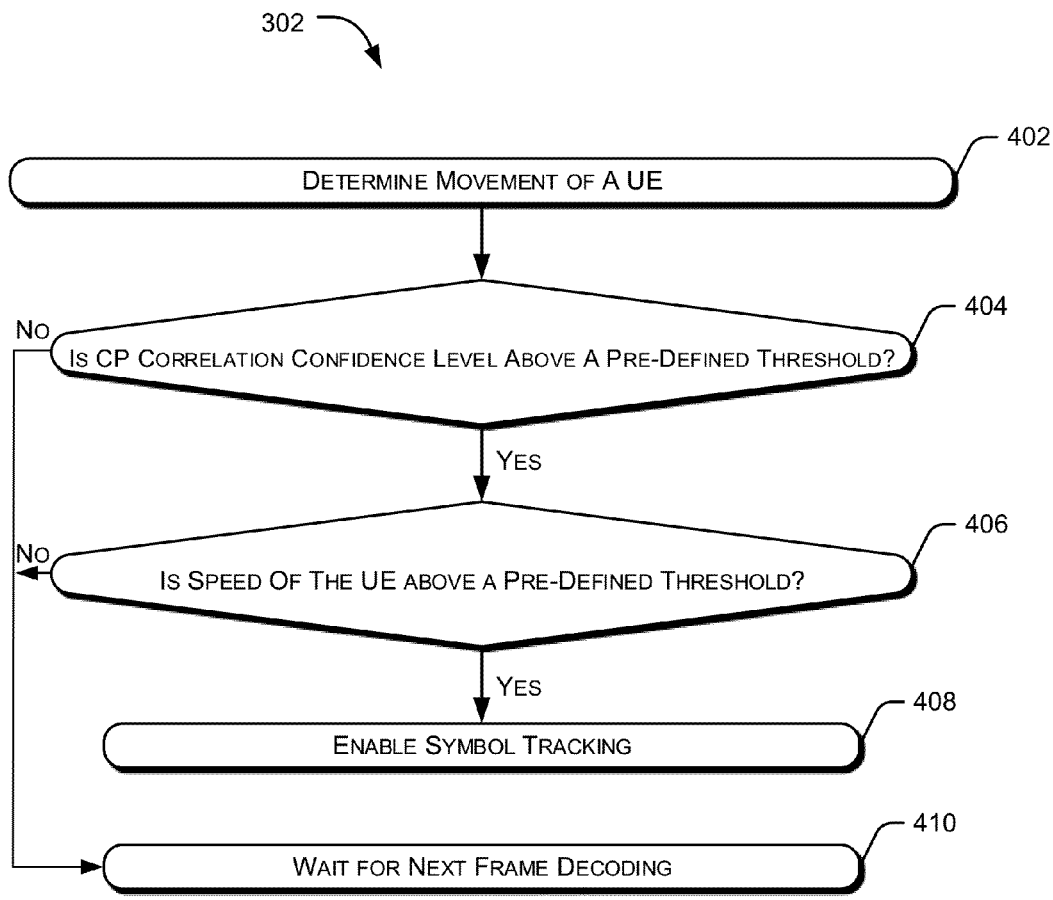

With reference to method 400 as depicted in FIG. 4, as shown in block 402, the movement of the UE 102 is detected. In one example, the MSSE 134 determines the movement of the UE 102. In some embodiments, the MSSE 134 may determine the movement of the UE 102 based on inputs from the Global Positioning System (GPS) chip or module of the UE 102.

As depicted in block 404, it is determined whether the CP correlation confidence level is above a pre-defined threshold. In one example, the MSSE 134 determines whether the CP correlation confidence level is above the pre-defined threshold.

If at block 404 it is determined that the CP correlation confidence level is above the pre-defined threshold, then as illustrated in block 406, it is determined whether the speed of the UE is above a pre-defined threshold. In one example, the MS SE 134 determines whether the speed of the UE above a pre-defined threshold.

If at block 408, it is determined that the speed of the UE above a pre-defined threshold, then at block 408 symbol tracking is enabled. In one example, the MSSE 134 enables the symbol tracking.

If at block 404 it is determined that the CP correlation confidence level is below the pre-defined threshold or if at block 408, it is determined that the speed of the UE below the pre-defined threshold, then as depicted in block 410, the UE 102 waits for next frame decoding.

Computer System

Figure 5:
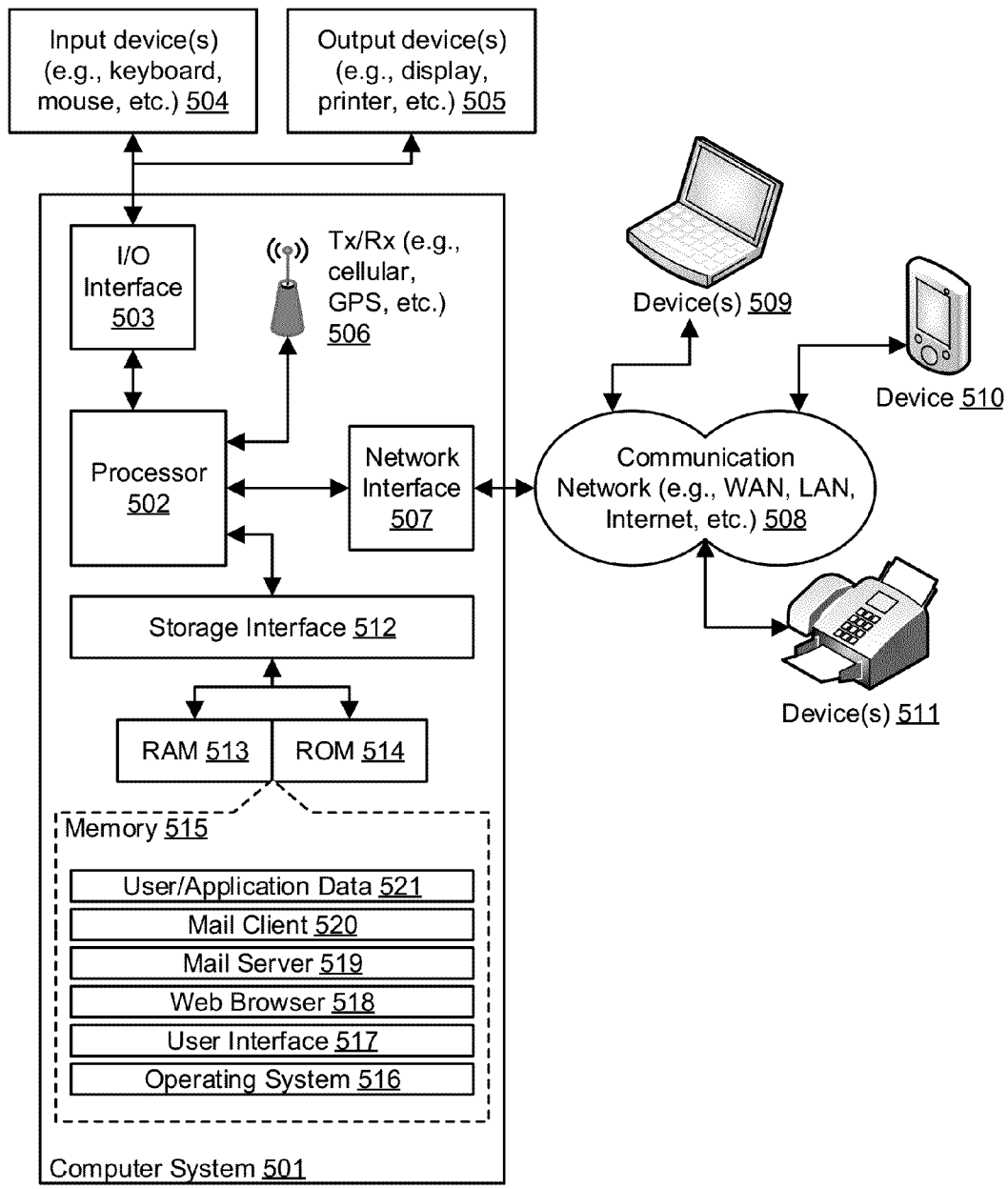
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing any of the devices presented in this disclosure. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 518-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 413, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol); secure sockets layer (SSL), Transport Layer Security (TLS), etc. Web browsers may utilize facilities such as AJAX, DHTML, Adobe Flash, JavaScript, Java; application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and a system for estimating symbol timing offset in wireless communication networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A communication management computing device comprising: a processor coupled to a memory and configured to execute programmed instructions stored in the memory, comprising:
   a processor coupled to a memory;
   the processor is configured to execute programmed instructions stored in the memory to: ~~converting~~ convert a received signal into one or more digital samples;
   ~~decoding~~ decode one or more symbols from the one or more digital samples based on an estimation of one or more symbol timing offsets, one or more cyclic prefix correlation peaks, and one or more cyclic prefix correlation confidence levels;
   ~~decoding~~ decode one or more frames by processing the decoded one or more symbols; and obtaining obtain data from the decoded frames, wherein the obtained data is to be forwarded to one or more applications, determine a movement speed of a user equipment associated with the communication management computing device;

determine whether at least one of the cyclic prefix correlation confidence level or the determined movement speed of the user equipment are above a pre-defined threshold; and enable symbol tracking when the at least one of the cyclic prefix correlation confidence level or the determined movement speed of the user equipment are above the pre-defined threshold.

2. The device as set forth in claim 1, wherein the processor is further configured to execute programmed instructions stored in the memory further comprising to:

determine whether symbol tracking is enabled;

compute the one or more symbol timing offset estimates for each of the digital samples when symbol tracking is enabled;

perform one or more symbol timing adjustments based on the computed one or more symbol timing offset estimates; and compute the cyclic prefix correlation peaks and the cyclic prefix correlation confidence levels.

3. The device as set forth in claim 1, wherein the processor is further configured to execute programmed instructions stored in the memory further comprising to:

convert the decoded one or more symbols into a frequency domain for further processing, and perform equalization on the processed one or more symbols to extract data bits from the processed one or more symbols.

4. The device as set forth in claim 1, wherein the processor is further configured to execute programmed instructions stored in the memory further comprising to:

convert the decoded one or more symbols from serial to parallel based on a number of carriers from which the received signal is received.

5. A method for estimating symbol timing offset, the method comprising:

converting, by a communication management computing device, a received signal into one or more digital samples;

decoding, by the communication management computing device, one or more symbols from the one or more digital samples based on an estimation of one or more symbol timing offsets, one or more cyclic prefix correlation peaks, and one or more cyclic prefix correlation confidence levels;

decoding, by the communication management computing device, one or more frames by processing the decoded one or more symbols; and obtaining, by the communication management computing device, data from the decoded frames, wherein the obtained data is to be forwarded to one or more applications;

determining a movement speed of a user equipment associated with the communication management computing device;

determining whether at least one of the cyclic prefix correlation confidence level or the determined movement speed of the user equipment are above a pre-defined threshold; and enabling symbol tracking when the at least one of the cyclic prefix correlation confidence level or the determined movement speed of the user equipment are above the pre-defined threshold.

6. The method as set forth in claim 5, further comprising:

determining, by the communication management computing device, whether symbol tracking is enabled;

computing, by the communication management computing device, the one or more symbol timing offset estimates for each of the digital samples when symbol tracking is enabled;

performing, by the communication management computing device, one or more symbol timing adjustments based on the computed one or more symbol timing offset estimates; and computing, by the communication management computing device, the cyclic prefix correlation peaks and the cyclic prefix correlation confidence levels.

7. The method as set forth in claim 5, further comprising:

converting, by the communication management computing device, the decoded one or more symbols into a frequency domain for further processing, and performing, by the communication management computing device, equalization on the processed one or more symbols to extract data bits from the processed one or more symbols.

8. The method as set forth in claim 5 further comprising:

converting, by the communication management computing device, the decoded one or more symbols from serial to parallel based on a number of carriers from which the received signal is received.

9. A non-transitory computer readable medium having stored thereon instructions for estimating symbol timing offset comprising machine executable code which when executed by a processor, causes the processor to perform steps comprising:

convert a received signal into one or more digital samples;

decode one or more symbols from the one or more digital samples based on an estimation of one or more symbol timing offsets, one or more cyclic prefix correlation peaks, and one or more cyclic prefix correlation confidence levels;

decode one or more frames by processing the decoded one or more symbols; and obtain data from the decoded frames, wherein the obtained data is to be forwarded to one or more applications;

determine a movement speed of a user equipment associated;

determine whether at least one of the cyclic prefix correlation confidence level or the determined movement speed of the user equipment are above a pre-defined threshold; and enable symbol tracking when the at least one of the cyclic prefix correlation confidence level or the determined movement speed of the user equipment are above the pre-defined threshold.

10. The non-transitory computer readable medium of claim 9, wherein the non-transitory medium comprises further computer executable instructions, which, when executed on the computing system, causes the computing system to perform the steps of:

determine whether symbol tracking is enabled;

compute the one or more symbol timing offset estimates for each of the digital samples when symbol tracking is enabled;

perform one or more symbol timing adjustments based on the one or more symbol timing offset estimates; and compute the cyclic prefix correlation peaks and the cyclic prefix correlation confidence levels.

11. The medium as set forth in claim 9, wherein the medium further comprises machine executable code which, when executed by the processor, causes the processor to perform steps further comprising:

convert the decoded one or more symbols into a frequency domain for further processing, and perform equalization on the processed one or more symbols to extract data bits from the processed one or more symbols.

12. The medium as set forth in claim 9, wherein the medium further comprises machine executable code which, when executed by the processor, causes the processor to perform steps further comprising:

convert the decoded one or more symbols from serial to parallel based on a number of carriers from which the received signal is received.

* * * * *